United States Patent [19]
Klitz

[11] 4,015,679
[45] Apr. 5, 1977

[54] DRIVE RANGE AND LOCK CONTROL SYSTEM

[75] Inventor: Ronald J. Klitz, Mosinee, Wis.

[73] Assignee: J. I. Case Company, Racine, Wis.

[22] Filed: May 16, 1975

[21] Appl. No.: 578,354

[52] U.S. Cl. .............................. 180/66 R; 60/483; 60/486

[51] Int. Cl.² .................................. F16H 39/48

[58] Field of Search ............ 180/6.48, 66 R, 44 F, 180/44 M; 60/484, 483, 489, 486, 494

[56] References Cited
UNITED STATES PATENTS

| | | | |
|---|---|---|---|
| 1,156,816 | 10/1915 | Rich | 60/483 |
| 2,370,526 | 2/1945 | Doran | 60/483 X |
| 3,153,900 | 10/1964 | Pigeroulet | 60/468 X |
| 3,604,313 | 9/1971 | Fruehauf | 60/484 |
| 3,768,263 | 10/1973 | Olson | 60/483 X |
| 3,849,985 | 11/1974 | Ratliff | 60/483 |

Primary Examiner—Philip Goodman
Assistant Examiner—R. Schrecengost
Attorney, Agent, or Firm—Dressler, Goldsmith, Clement, Gordon & Shore, Ltd.

[57] ABSTRACT

A hydraulic control system for use with a vehicle having an earthworking implement for selecting the speed range and for locking the vehicle in a forward drive condition.

11 Claims, 2 Drawing Figures

DRIVE RANGE AND LOCK CONTROL SYSTEM

BACKGROUND OF THE INVENTION

This invention relates to a hydraulic system for supplying hydraulic fluid to a plurality of hydraulic drive motors found in heavy equipment, such as excavators, backhoes and the like.

In recent years, the use of hydraulic drive systems for controlling the various functions in heavy equipment, for example, vehicles having earthworking implements, such as excavators, has become more common. For example, quite recently, completely hydraulic systems have been developed for use with heavy duty vehicles such as excavators.

In such systems, the actuation of control valves that control the flow of fluid to the various drive motors is accomplished by hydraulic fluid. One example of such a system incorporates a main hydraulic circuit that includes one or more main pumps and a plurality of hydraulically actuated valves that control the flow of fluid between the pumps, a reservoir and hydraulic motors associated therewith. Typically, the valves are self-centering and are opened by a control circuit that is capable of supplying small amounts of fluid under pressure from a source to opposite ends of the valves for actuating the valves. The fluid flow in the control circuit is controlled by manually and electrically operated valves and acts as a "pilot system" for actuating the main control valves.

Such a system has a number of advantages, the primary one being that the function that is being performed can be accurately controlled. For example, utilizing the "pilot system" for actuating the main valves gives the operator the ability to introduce very small amounts of fluid to the hydraulic motors.

While such systems have found a remarkable degree of success, they are susceptible of improvements to provide additional capabilities, thereby enhancing their usefulness, desirability and potential for commercial acceptance and success.

For example, because of the power and torque often required to move such vehicles along the ground, they tend to move relatively slowly. This slow movement is also advantageous in facilitating maneuverability.

There are occasions when it would be desirable to increase the maximum speed of travel, e.g., when it is desired to travel over extended distances. Under these circumstances, maximum torque or power is not usually required. In addition, when traveling long distances, it would also be desirable to relieve the operator from maintaining pressure on a manual control lever in order to sustain movement, which can result in operator fatigue and may also limit the operator's ability to perform other functions simultaneously.

SUMMARY OF THE INVENTION

According to the present invention there is provided in a hydraulic system used to control the movement of heavy equipment vehicles such as excavators, the capability of operating hydraulic drive motors at two speeds and the capability of locking the drive motors in a forward travel condition to permit the operator to remove his hands or feet from the manually operated control valve.

More specifically, heavy equipment such as excavators are supported on a pair of ground engaging members or tracks each of which is driven by a separate hydraulically operated positive displacement gear motor. Such gear motors may be two-speed drive motors comprised of a pair of gear motor sections. The speed capability of the drive motor is a function of whether one or both of the motor gear sections are utilized.

The selection of one or both of the gear sections is controlled by a solenoid actuated valve connected in an electrical circuit including selectively operable switch means for selectively energizing the solenoid valve.

In addition, a drive lock solenoid valve is connected in an electrical circuit and, when energized, is operative to bypass the usual manual control valve to effect forward travel operation of the drive motor.

From the foregoing, it will be observed that numerous variations and modifications may be effected without departing from the true spirit and scope of the novel concept of the invention. It is, of course, intended to cover by the appended claims all such modifications as fall within the scope of the claims.

DETAILED DESCRIPTION

Figure 1:
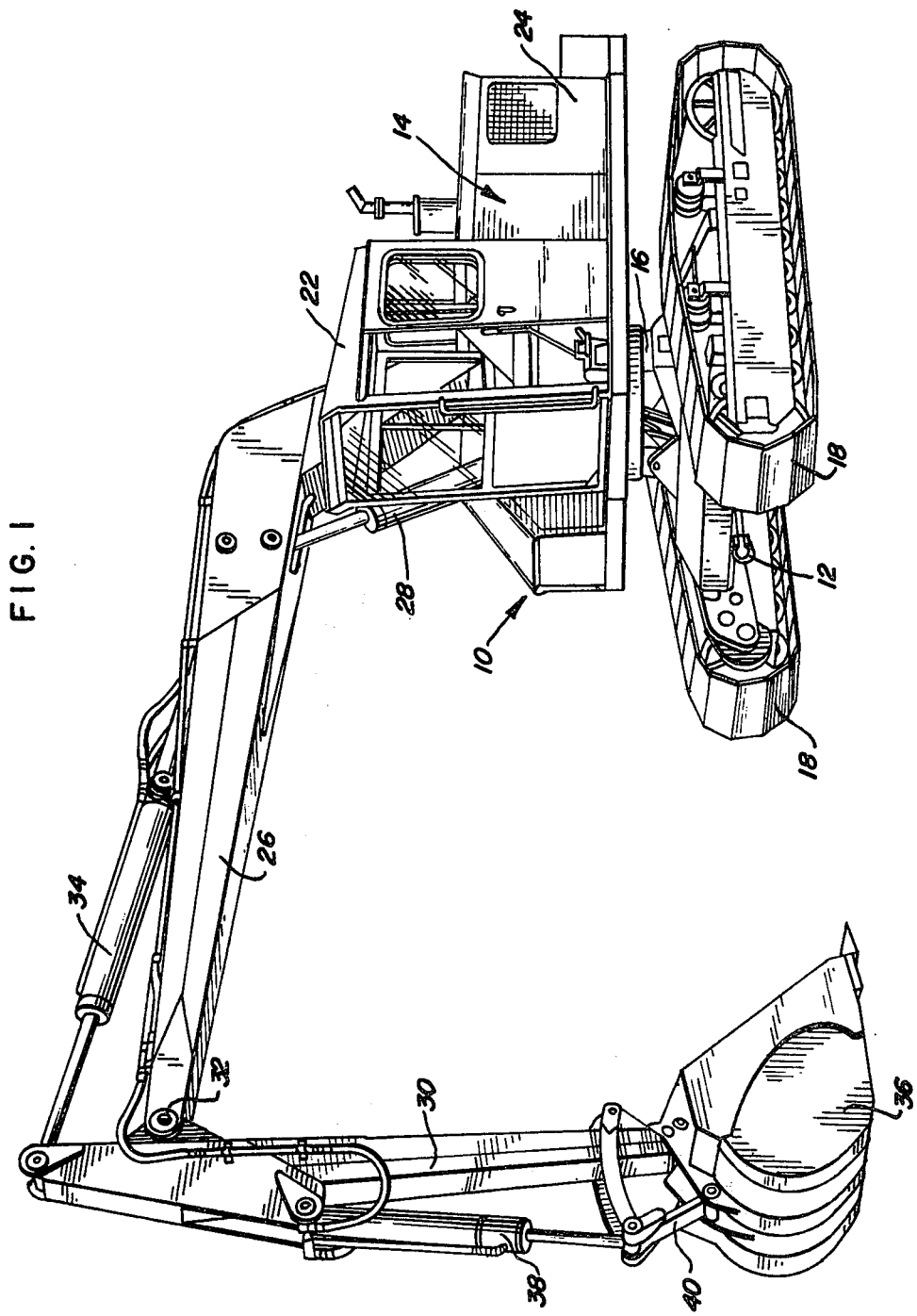
FIG. 1 is a pictorial view of a shovel-type excavator wherein the hydraulic system forming the substance of this invention is particularly useful.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Referring now to FIG. 1, there is shown a shovel-type excavator, generally indicated by reference numeral 10, having an undercarriage 12 and an upper structure 14. The upper structure is pivotally carried about a vertical axis on a turntable 16. A hydraulic motor (not shown) operated by pressurized hydraulic fluid is provided for pivoting or swinging the upper structure 14 relative to undercarriage 12.

Undercarriage 12 is supported by a pair of ground engaging members or tracks 18 which are driven by separate hydraulically operated positive displacement drive motors 20 (See FIG. 2) also driven by pressurized fluid. Upper structure 14 includes a cab 22 for the operator and a propulsion unit 24, such as an engine, for driving pumps, as will be described later.

A main lift boom 26 is pivotally mounted about a horizontal pivot axis (not shown) on upper structure 14 and is pivoted by hydraulic motor means 28 illustrated as a lift or hoist cylinder and piston rod assembly interposed between upper structure 14 and boom 26.

A dipper stick 30 is pivotally connected to the outer end of boom 26 by pivot pin 32 which is substantially parallel to the axis or pivotal connection of boom 26 to upper structure 14. A second hydraulic motor means 34 is interposed between boom 26 and a free end portion of dipper stick 30. Again, hydraulic motor means 34 is illustrated as a cylinder and piston rod assembly which acts as a crowd cylinder to pivot the dipper stick 30 relative to boom 26.

A bucket 36 is pivotally mounted on the outer end of dipper stick 30 for movement about a horizontal axis by a third hydraulic motor means 38. Third hydraulic motor means 38 again consists of a cylinder and piston rod assembly which has one end connected to dipper stick 30 and the opposite end connected to bucket 36 through a linkage 40.

In a large excavator of this type, it is customary to provide two separate main hydraulic pumps which are driven by the engine or power plant of the vehicle and the respective pumps are connected to the respective hydraulic motor means through conduits having pilot operated control valves therein. Since the present invention relates only to a portion of the entire hydraulic control circuit for the vehicle, only a selected portion of the circuit has been illustrated in FIG. 2.

Figure 2:
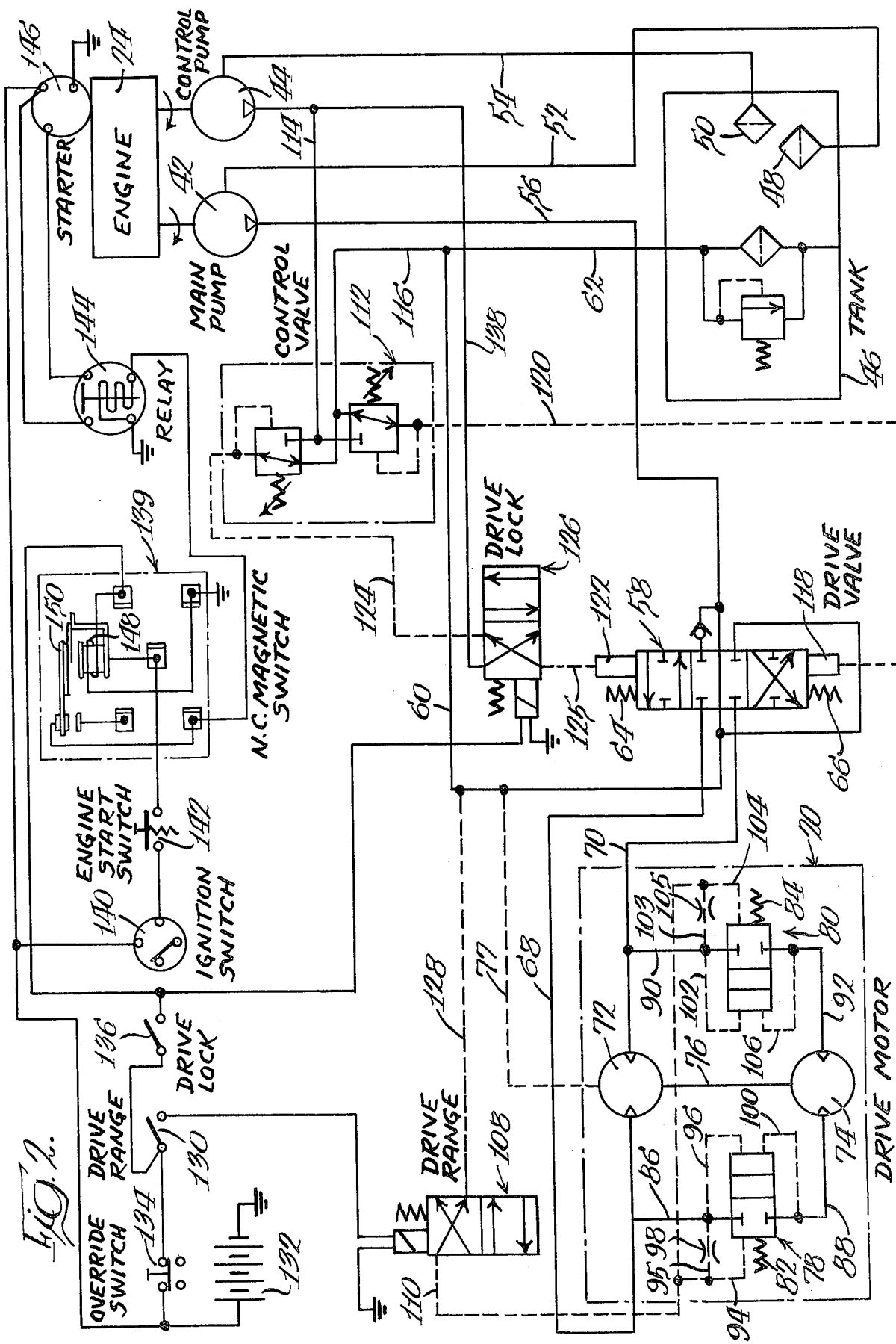
FIG. 2 is a schematic diagram of a hydraulic system incorporating the present invention.

FIG. 2 shows an engine 24 driving a main pump 42 and a control pump 44 both of which draw fluid from a reservoir or tank 46. Suitable filters 48, 50 may be placed at the inlets of the respective conduits 52, 54 leading from the reservoir 46 to the main pump 42 and the control pump 44, respectively.

The main pump or main pump means 42 delivers fluid under pressure through a main supply conduit 56 to fluid actuated drive valve means 58 which is also connected to the reservoir 46 through return conduits 60, 62. The main drive valve means 58 consists of a three position valve which is normally biased to the illustrated center, closed position by a pair of springs 64, 66 respectively, cooperating with opposite ends of the control valve spool forming part of the drive valve means 58. The drive valve means 58 is also connected to opposite ends of drive motor means 20 through a pair of drive motor conduits 68, 70.

The drive motor means 20 includes a fluid operated two-speed drive motor having two gear sections 72, 74 interconnected by shaft 76. An additional conduit 77 connects gear section 72 to return conduit 60. When all of the fluid flow from the main pump 42 is directed through one gear section 72, the torque output of drive motor means 20 is reduced, but the output speed is increased. Conversely, if pump flow is directed through both sections, 72, 74 simultaneously, the torque output is maximimized and the speed is reduced.

As shown in FIG. 2, the drive control valve 58 is connected directly to the first gear section 72 of the drive motor means 20 through the drive motor conduits 68, 70. The second gear section 74 is connected to the drive motor conduits 68, 70 in parallel with the first gear motor section 72 through a pair of speed selection valve means 78, 80, each being normally biased to its closed position by a spring 82, 84 cooperating with one end of the valve spool forming a part of each of the valves 78, 80, respectively.

conduits 86, 88 connect the speed selection control valve means 78 between drive motor conduit 68 and one side of the second gear section 74. Similarly, control conduits 90, 92 connect the second speed selection valve means 80 between drive motor conduit 70 and the other side of the second gear section 74. Control conduits 94, 95, 96 connect both ends of the valve spool of the speed selection valve means 78 to the conduit 86, conduit 95 including a pressure reducing orifice 98. The end of the control spool opposite from the spring 82 is also connected to the conduit 88 through another control conduit 100.

Control conduits 102, 103, 104 connect both ends of the valve spool of the speed selection valve means 80 to the conduit 90, conduit 103 including a pressure reducing orifice 105. The end of the control spool opposite from the spring 84 is also connected to the conduit 92 through another control conduit 106. Conduits 94, 95, 96 and conduits 102, 103, 104 are connected to a solenoid operated drive range control valve means 108 through conduit 110, which together define an auxilliary speed control circuit.

Operation of the speed selection valves 78, 80 and the supply of fluid between the drive motor means 20, the main pump means 42 and the reservoir 46 is controlled by actuation of the drive valve means 58 through a control circuit which incorporates the control pump 44. For the purpose of controlling operation of the drive valve means 58, the control pump 44 is connected to manually operated modulator or drive control valve means 112 through a first control conduit 114. The drive control valve means 112 is connected to the reservoir 46 through return conduits 62, 116. In addition, the drive control valve means 112 is connected to one end 118 of the control spool of the drive valve means 58 through control conduit 120, and to the other end 122 of the control spool through control conduits 124, 125 between which is disposed a drive lock solenoid valve means 126.

The drive control valve means 112 is manually actuated, either through a hand operated control lever or a foot lever, and is capable of being manipulated to supply fluid under pressure from the control pump 44 through either conduit 120, or conduits 124, 125 when drive lock valve means 126 is in the position illustrated in FIG. 2. Since the drive control valve means 112 is a commercially available valve, no details thereof appear to be necessary. However, it should be noted that such valves are capable of accurately controlling small amounts of flow to accurately control the flow of fluid through the drive valve means to and from the drive motor means.

Operation of the speed selection valve means 78, 80 is determined by the drive range solenoid valve means 108. In the position illustrated in FIG. 2, the drive range solenoid valve means 108 connects both ends of the valve spools of the speed selection valves 78, 80 to the tank or reservoir 46 through conduits 60, 62, 94–96, 102–104, 110, 128. This permits operation of the speed selection valve means 78, 80 thereby connecting the fluid flow in conduits 68, 70 through the main drive valve means 58 to both gear sections 72, 74 of the drive motor, as described in more detail below. When energized, however, the drive range solenoid valve means 108 is closed, locking the speed selection control valves 78, 80 in the illustrated, closed position, and directing all of the fluid flow from the main pump 42 through only the first gear section 72 to provide increased operational speed.

The drive range solenoid valve means 108 is energized by closure of the drive range switch 130 connected between the solenoid valve means 108 and a source of electrical energy, e.g., the vehicle battery 132 through a spring biased, normally closed override switch 134 which, e.g., may be located in the handle of the drive control valve control lever.

The system may also be locked into the forward travel condition so the operator may remove his hand (or foot) from the drive control or modulator valve means 112 and still have the machine continue to travel forward. This is of particular advantage when traveling substantial distances, in order to reduce operator fatigue, or when it is desirable for the operator to operate other functions simultaneously.

Locking the vehicle in forward condition is accomplished by closure of the drive lock switch 136 to energize the drive lock solenoid valve means 126. When energized, the drive lock solenoid valve means connects the control pump 44 directly to one end 122 of the control spool of the drive means 58 through conduits 125, 138 to shift the main drive valve means 58 into the forward position. When energized, the drive lock solenoid valve means 126 bypasses the drive control or modulator valve means 112, thereby enabling that operator to release that valve without stopping the vehicle.

Typically, the drive lock switch 136 is closed when high speed movement is desired. Under these circumstances, if the operator wishes to disengage both the high speed and the forward lock operation, this may be accomplished by depression of the override switch 134 or by opening both the drive range switch 130 and the drive lock switch 136. The override switch 134, when depressed, opens the electric circuit through the drive range and the drive lock switches 130, 136, thereby deenergizing both the drive range solenoid valve means 108 and the drive lock solenoid valve means 126. When the override switch 134 is released, it returns to its normally closed position to reenergize both solenoid valves if the drive range and drive lock switches are closed.

Since the drive lock solenoid valve means 126 when energized bypasses the drive control valve means 112, it is desirable to preclude the ability to start the engine 24 when the drive lock valve switch 136 is closed. To accomplish this, a normally closed magnetic switch 139 is connected to the engine starting circuit, which includes the ignition switch 140, start switch 142, the start relay 144 and the starter 146. The drive lock switch 136 is also connected to the coil 148 of the normally closed magnetic switch 139 so that when the drive lock switch 136 is closed, the coil 148 is energized to open the normally closed contacts 150 of the magnetic switch 139 to disconnect the starter relay 144 and starter 146 from the ignition system. This prevents the operator from starting the engine when the drive lock switch is closed.

It is believed that the above description provides an adequate basis for understanding the present invention and its operation. During normal operation of the excavator, the main pump 42 and the control pump 44 are being driven by the engine 24 to provide a main supply of fluid and a control supply of fluid for operating the various fluid operated devices.

More specifically, in the portion of the circuit illustrated, the control pump means 44 supplies fluid under pressure to the drive control or modulator valve means 112 so that the drive valve means 58 may be fluid actuated by manipulation of the manual control lever to control the flow of fluid to and from the drive motor. In the low speed or normal range, the drive range solenoid valve 108 is in the position illustrated in FIG. 2.

If it is desired to move the vehicle or excavator in the forward direction, the drive control valve means 112 is actuated to apply fluid pressure through conduits 124, 125 and drive lock valve 126 to the upper end 122 of the drive valve control spool, as shown in FIG. 2, causing fluid to flow to the drive motor means 20 through the conduit 68 and from the drive motor through conduit 70. This fluid flow passes directly through the first gear section 72 and is also applied to both sides of the control spool of the speed selection valve 78 through conduits 86, 94, 95, 96.

Since, the fluid in conduits 94, 95 passes through the orifice 98 reducing the pressure, the increased pressure at the opposite end of the spool opens the valve 78 and allows fluid flow to pass through the valve to the second gear section 74 of the drive motor. This is possible because of the direct connection of both ends to the reservoir 46 through conduit 110 and the deenergized drive range solenoid valve 108 in the position illustrated. The fluid passing through the drive motor is applied to the bottom of the second speed control valve 80 and also to the one end of the control spool through conduit 106 to open that valve and connect conduits 90, 92 to conduit 70.

When it is desired to shift into the high speed, the drive range switch 130 is closed, energizing the drive range solenoid valve 108 to close it and disconnect the conduit 110 from the reservoir 46. Under these circumstances, the speed selection valves 78, 80 cannot be opened because the conduit 110 is blocked, and there can be no flow of the fluid through conduits 86, 92, and the second gear section 74.

As explained above, when it is desired to lock the vehicle in the forward travel position, drive lock switch 136 is closed to energize drive lock solenoid valve means 126. This connects the control pump through conduits 125 and 138 directly to one end of the drive valve means 58 to actuate the drive valve and bypass the drive control valve means 112.

Thus there has been disclosed a hydraulic control system for controlling the movement of heavy equipment vehicles such as excavators provided with control circuitry to enable selective operation of the vehicle at low and high speeds, to enable locking of the vehicle in a forward travel condition and simultaneously preclude inadvertent starting of the vehicle when locked in the forward travel position. Furthermore, the control circuitry permits selective and momentary deactivation of either or both the high speed and drive lock functions when desired.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a vehicle having an earthworking implement supported thereon and first and second ground engaging means on opposite sides of said vehicle for supporting and driving said vehicle, a control system comprising: hydraulic drive motor means connected to operate said ground engaging means for driving said vehicle, said motor means including first and second drive motor sections; a hydraulic fluid reservoir: main hydraulic circuit means including said drive motor means, said reservoir, main pump means for supplying fluid under pressure from said reservoir to said drive motor means, fluid actuated drive valve means actuatable to control flow of pressurized fluid to and from said drive motor means, and speed control valve means in said main hydraulic circuit having a first position supplying fluid to both said drive motor sections at a first slower speed range and a second position precluding supply of fluid to one of said motor sections to operate said motor means at a second higher speed range; control hydraulic circuit means including said reservoir, said drive valve means, control pump means for supplying fluid under pressure to actuate said drive valve means, manually operated control valve means for controlling flow of fluid under pressure to and from said drive valve means to control actuation thereof; and selectively actuatable means operable to connect one of said hydraulic circuit means to said speed control valve means to move said speed control means to said second position.

2. A control system as claimed in claim 1 wherein:
said selectively actuatable means includes selectively actuatable valve means included in said main hydraulic circuit means; and
selectively operable switch means connected to said selectively actuatable valve means for effecting actuation thereof in response to operation of said selectively operable switch means.

3. A control system as defined in claim 2, in which said selectively actuatable valve means is a two position solenoid operated valve having a first position connecting said speed control valve means to said reservoir and a second position blocking flow from said speed control valve means to said reservoir so that said speed control valve means is moved to said second position in response to fluid flow from said main pump means.

4. In a vehicle having an earthworking implement supported thereon and first and second ground engaging means on opposite sides of said vehicle for supporting and driving said vehicle, a control system comprising: hydraulic drive motor means connected to operate said ground engaging means for driving said vehicle, said motor means including first and second drive motor sections; a hydraulic fluid reservoir; main hydraulic circuit means including said drive motor means, said reservoir, main pump means for supplying fluid under pressure from said reservoir to said drive motor means, and fluid actuated drive valve means actuatable to control flow of pressurized fluid to and from said drive motor means; control circuit means including said reservoir, said drive valve means, control pump means for supplying fluid under pressure to actuate said drive valve means, manually operated control valve means for controlling flow of fluid under pressure to and from said drive valve means to control actuation thereof; means selectively actuatable to preclude supply of fluid to one of said motor sections for increasing the speed range at which said vehicle may be driven, said selectively actuatable means includes selectively actuatable valve means included in said control circuit means and selectively operable switch means connected to said selectively actuatable valve means for effecting actuation thereof in response to operation of said selectively operable switch means; and additional switch means for effecting deactuation of said selectively actuatable valve means independently of said selectively operable switch means.

5. In a vehicle having an earthworking implement supported thereon and first and second ground engaging means on opposite sides of said vehicle for supporting and driving said vehicle, a control system comprising: hydraulic drive motor means connected to operate said ground engaging means for driving said vehicle, said motor means including first and second drive motor sections; a hydraulic fluid reservoir: main hydraulic circuit means including said drive motor means, said reservoir, main pump means for supplying fluid under pressure from said reservoir to said drive motor means, and fluid actuated drive valve means actuatable to control flow of pressurized fluid to and from said drive motor means; control circuit means including said reservoir, said drive valve means, control pump means for supplying fluid under pressure to actuate said drive valve means, manually operated control valve means for controlling flow of fluid under pressure to and from said drive valve means to control actuation thereof; means selectively actuatable to preclude supply of fluid to one of said motor sections for increasing the speed range at which said vehicle may be driven; and additional selectively actuatable means for controlling flow of fluid under pressure to and from said drive valve means independently of said manually operated valve means.

6. A control system as claimed in claim 5 wherein:
said additional selectively actuatable means includes selectively actuatable valve means included in said control circuit means; and
selectively operable switch means connected to said solenoid operated valve means for effecting actuation thereof and thereby said independent actuation of said drive valve means.

7. A control system as claimed in claim 6 including:
additional switch means for effecting deactuation of said selectively actuatable valve means independently of said selectively operable switch means.

8. A control system as claimed in claim 6 including:
an ignition and starting circuit for said vehicle;
dependent switch means connected in said ignition circuit and responsive to operation of said selectively operable switch means to preclude operation of said start circuit.

9. In a vehicle having an earthworking implement supported thereon and first and second ground engaging means on opposite sides of said vehicle for supporting and driving said vehicle, a control system comprising: hydraulic drive motor means connected to operate said ground engaging means for driving said vehicle, said motor means including first and second drive motor sections; a hydraulic fluid reservoir: main hydraulic circuit means including said drive motor means, said reservoir, main pump means for supplying fluid under pressure from said reservoir to said drive motor means, and fluid actuated drive valve means actuatable to control flow of pressurized fluid to and from said drive motor means; control circuit means including said reservoir, said drive valve means, control pump means for supplying fluid under pressure to actuate said drive valve means, manually operated control valve means for controlling flow of fluid under pressure to and from said drive valve means to control actuation thereof; means selectively actuatable to preclude supply of fluid to one of said motor sections for increasing the speed range at which said vehicle may be driven, said selectively actuatable means including first solenoid actuated valve means included in said control circuit means; second solenoid actuated valve means included in said control circuit means for controlling flow of fluid under pressure to and from said drive valve means independently of said manually operated valve means; and an electric control circuit including a source of electrical energy and first and second manually operable switch means; said first manually operable switch means being connected between said source and said first solenoid actuated valve means, whereby said first solenoid actuated valve means is actuated upon closure of said first switch means to preclude supply of fluid to one of said motor sections; said second manually operable switch means being connected between said source and said second solenoid operated valve means, whereby said second solenoid actuated valve means is actuated in response to closure of said second switch means to effect said independent actuation of said drive valve means.

10. A control system as claimed in claim 9 including: additional fluid actuated valve means normally operable in response to actuation of said drive valve means for effecting supply of fluid to both of said motor sections to operate said motor means at a first slower speed range, and responsive to actuation of said first solenoid actuated valve means for precluding supply of fluid to said one motor section to operate said motor at a second higher speed range.

11. A control system as claimed in claim 9 including: additional normally closed switch means connected between said source and said first and second manually operated switch means and operable when open to effect deactuation of said first and second solenoid actuated valve means independently of said first and second manually operated switch means, and means biasing said additional switch means to its normally closed position.

* * * * *